3,206,499
PREPARATION OF ACRYLONITRILE
George E. Ham, Lake Jackson, Tex., assignor to The Dow Chemical Company, Midland, Mich., a corporation of Delaware
No Drawing. Filed Jan. 10, 1962, Ser. No. 165,319
1 Claim. (Cl. 260—465.9)

This invention relates to a new process for the preparation of acrylonitrile from 1,2-difunctional ethane derivatives.

It is known that alkali metal cyanides react with 1,2-difunctional ethane derivatives such as ethylene dichloride to make succinonitrile. It is also known that hydrogen cyanide and ethylene dichloride react at very high temperatures in the gaseous phase to make the intermediate 3-chloropropionitrile which dehydrochlorinates under these conditions to acrylonitrile.

It has now been found that in the reaction of an alkali metal cyanide with a 1,2-difunctional ethane compound such as ethylene dichloride, acrylonitrile is formed as an intermediate product according to the equation $$Cl-CH_2CH_2-Cl + 2NaCN \rightarrow CH_2=CH-CN + HCN + 2NaCl$$

It has also been found that by carrying out the reaction under suitable conditions of temperature and pressure, the intermediate acrylonitrile can be separated by distillation from the reaction mixture substantially as it is formed, thereby preventing the further progress of the reaction toward the production of succinonitrile. It has been determined that carrying out the reaction at about 50° C. to about 200° C. and under atmospheric or subatmospheric pressure enables the production and separation of acrylonitrile as a major product of the process.

The 1,3-difunctional ethane derivatives which are operable in this process are those compounds represented by the formula $$X-CH_2CH_2-Y$$

where X and Y are radicals capable of replacement by a cyanide group to make the corresponding nitrile upon reaction with an inorganic cyanide. The symbols X and Y, therefore, stand for radicals such as halogen, where halogen means chlorine, bromine, or iodine, and sulfonate or sulfate ester groups of the formula $RSO_2O-$ or $ROSO_2O-$ respectively, R being an organic radical. The groups X and Y may be similar, that is, X may be bromine and Y chlorine, or both X and Y may be bromine, or both may be sulfonate, or they may be dissimilar, for example, X may be chlorine and Y a sulfonate group, or X may be bromine and Y a sulfate ester group. Representative compounds thereby represented are the ethylene dihalides, 2-haloethane alkyl or aryl sulfonates, ethylene bis(arylsulfonates), and sulfate esters similar to the sulfonates named. Particularly adapted to this process are the bis(2-haloethyl) sulfates.

Preferably, the process is operated by adding finely divided solid alkali metal cyanide to a solution of the 1,2-disubstituted ethane in a suitable inert solvent at a temperature between about 50° C. and about 200° C. and under a pressure no higher than atmospheric pressure, i.e., 760 mm. of Hg, the conditions of the reaction being such that the acrylonitrile is distilled from the mixture more or less as it is produced. The distillate consists of acrylonitrile, hydrogen cyanide, and varying amounts of 1,2-disubstituted ethane and solvent depending upon their boiling points. Acrylonitrile is ordinarily separated from the condensed mixture by distillation.

By alkali metal is meant any of Group 1A of the periodic table of elements, this group comprising lithium, sodium, potassium, and rubidium. Sodium cyanide is preferred for its lower cost.

Because the the critical point of this new process is the speed with which acrylonitrile can be removed from the reaction mixture, the 1,2-disubstituted ethane and the reaction solvent, if any, are both advantageously selected from those having boiling points substantially above that of the desired product. Thus, a good yield of acrylonitrile is more easily obtained when ethylene dibromide is used as a reactant rather than the lower boiling ethylene dichloride. Similarly, reaction solvents having boiling points well above the boiling points of acrylonitrile are preferred for the same reason. Such higher boiling reactants and solvents also avoid undue dilution of the product in the distillate. Solvents suitable for use in the process are those which can be used in the general reaction.

$$RX + MCN \rightarrow RCN + MX$$

wherein M is alkali metal and R and X are as defined above. These solvents include lower aliphatic alcohols, ethylene glycol ethers, lower aliphatic nitriles, dimethylformamide, dimethyl sulfoxide, and solvents of similar nature. A minor amount of water may be included with the solvent. For the reasons explained above, solvents of the above group having boiling points above 80° C. are preferred.

The pressure and temperature levels at which the process is to be operated are chosen from the ranges shown above taking into consideration the boiling points of the materials involved and the desirability of keeping the proportion of acrylonitrile in the distillate as high as practically possible. A pressure of about 1–200 mm. Hg absolute and a reaction temperature of about 75–150° C. are preferred. Obviously, the reaction temperature must be above the boiling point of acrylonitrile at the pressure chosen.

The ratio of reactants is not a critical point, but preferably a ratio of from about the stoichiometric one mole to about 20 moles of 1,2-disubstituted ethane to two moles of cyanide is used. Most preferred is an excess of 1,2-disubstituted ethane in the range of about 2–4 moles per mole of cyanide.

The following examples illustrate ways in which the principle of the invention has been applied but are not to be construed as limiting the scope thereof.

*Example 1*

Into a one liter reaction flask equipped with a thermometer, a stirrer, a tube through which solids could be added, and connected to a distillation column vented through a Dry Ice trap, was put 500 ml. of dimethyl sulfoxide and 99.0 g. (1.0 g. mole) of ethylene dichloride. The mixture was heated to 100° C. and the pressure on the system was lowered until refluxing began in the distillation column head. One half gram mole of solid sodium cyanide was then added in small portions to the boiling mixture over a period of 45 minutes. After the cyanide addition was complete, the pressure was lowered further and heating at 100° C. was continued until there was nothing more passing into the Dry Ice trap. From the trap there was obtained 81.0 g. of liquid which was found on analysis to contain 0.016 g. mole of acrylonitrile.

*Example 2*

In the manner described in Example 1, 1.0 g. mole of 1-bromo-2-chloroethane was reacted with 0.50 g. mole of solid sodium cyanide over a period of 66 minutes at 100–120° C. with the reaction system under a pressure of 105 mm. Hg absolute. The distillate contained 0.112 g. mole of acrylonitrile representing a yield of 44.8% based on the sodium cyanide used.

Example 3

In the manner described in Example 1, 1.0 g. mole of ethylene dibromide was reacted with 0.50 g. mole of solid sodium cyanide in 32 minutes at 100° C. under an absolute pressure of 74 mm. There was obtained 0.206 g. mole of acrylonitrile, a yield of 82.4% of the theoretical based on the starting sodium cyanide.

Using a procedure similar to that shown in the above examples, sodium cyanide or another alkali metal cyanide may be reacted with compounds such as 2-chloroethyl benezenesulfonate, 2-bromoethyl ethanesulfonate, ethylene bis(benzenesulfonate), 1-bromo-2-iodoethane, ethylene diiodide, ethylene dibromide, ethylene bromochloride, bis(2-chloroethyl) sulfate, or bis(2-bromoethyl) sulfate to make acrylonitrile.

I claim:

A process for making acrylonitrile which comprises reacting by contacting one mole of alkali metal cyanide with from about 0.5 to about 10 moles of a compound having the structure $$X-CH_2CH_2-Y$$

where $X$ and $Y$ are halogen of atomic number 17–53 inclusive in the presence of an inert solvent under 1–200 mm. Hg absolute pressure at about 75° C. to about 150° C., thereby separating by distilling arcylonitrile substantially as it is formed.

References Cited by the Examiner

UNITED STATES PATENTS

| | | | |
|---|---|---|---|
| 2,211,240 | 8/40 | Macallum | 260—465.8 |
| 2,429,450 | 10/47 | Harris | 260—265.9 |
| 2,467,373 | 4/49 | Dutcher et al. | 260—465.9 |

CHARLES B. PARKER, *Primary Examiner.*

LEON ZITVER, IRVING MARCUS, *Examiners.*